3,502,716
PROCESS FOR PREPARING ALKENE SULFONATES
George F. Kite, Springdale, Pa., assignor to Gulf Research & Development Company, Pittsburgh, Pa., a corporation of Delaware
No Drawing. Filed June 22, 1967, Ser. No. 647,905
Int. Cl. C07c *143/16, 139/00*
U.S. Cl. 260—513  12 Claims

ABSTRACT OF THE DISCLOSURE

A process for preparing alkene sulfonates which involves treating an anhydride of a hydroxy sulfonic acid with an alkali or alkaline earth metal carboxylate.

---

This invention relates to a process for preparing a mixture predominating in alkene sulfonates which comprises treating an anhydride of a hydroxy sulfonic acid with an alkali or alkaline earth metal carboxylate under selected reaction conditions.

The anhydride of a hydroxy sulfonic acid that can be employed herein can be defined by reference to the following structural formula:

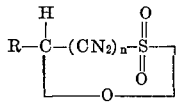

wherein R can be an alkyl substituent having from two to 26 carbon atoms, preferably from six to sixteen carbon atoms, such as ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl, n-tricosyl, n-tetracosyl, n-pentacosyl, n-hexacosyl, isopropyl, isobutyl, t-butyl(pivalyl), 3 - methylpentyl, 3 - methyldecyl, 4 - methylhexadecyl, 4-methylheneicosyl, 3-ethyltetradecyl, 6-propyloctadecyl, 3,6-dimethyltetradecyl, 2,8-dimethylheneicosyl, 5-ethyl, 7-methyloctadecyl, 3-methoxydecyl, 6-ethoxypentadecyl, 4-nitrohexadecyl, 8-phenyloctadecyl, 3-decenyl, 6-tetradecenyl, etc., and $n$ is an integer from two to three. The anhydride of a hydroxy sulfonic acid can be obtained in any suitable manner, for example, by dehydration of the corresponding hydroxy sulfonic acids at a temperature on the order of about 75° to about 250° C. and a pressure of about 0.002 to about fifteen pounds per square inch. Another method that can be employed to obtain the anhydride of a hydroxy sulfonic acid employed herein involves, for example, reacting approximately equal molar amounts of an appropriate olefin and gaseous $SO_3$ at a temperature of about 10° to about 150° C., and a pressure of about 0.05 to about twenty pounds per square inch for about 0.1 second to about five hours. Specific examples of hydroxy sulfonic acid anhydrides that are suitable for the defined purpose include 4-hydroxyhexane-1-sulfonic acid anhydride, 4-hydroxyheptane-1-sulfonic acid anhydride, 4-hydroxyoctane-1-sulfonic acid anhydride, 4-hydroxynonane-1-sulfonic acid anhydride, 4-hydroxydecane-1-sulfonic acid anhydride, 4-hydroxyundecane-1-sulfonic acid anhydride, 4-hydroxydodecane-1-sulfonic acid anhydride, 4-hydroxytridecane-1-sulfonic acid anhydride, 4-hydroxytetradecane-1-sulfonic acid anhydride, 4-hydroxypentadecane-1-sulfonic acid anhydride, 4-hydroxyhexadecane-1-sulfonic acid anhydride, 4-hydroxyheptadecane-1-sulfonic acid anhydride, 4-hydroxyoctadecane-1-sulfonic acid anhydride, 4-hydroxynonadecane-1-sulfonic acid anhydride, 4-hydroxyeicosane-1-sulfonic acid anhydride, 4-hydroxyheneicosane-1-sulfonic acid anhydride, 4-hydroxydocosane-1-sulfonic acid anhydride, 4 - hydroxytricosane-1-sulfonic acid anhydride, 4-hydroxytetracosane-1-sulfonic acid anhydride, 4-hydroxypentacosane-1-sulfonic acid anhydride, 4-hydroxyhexacosane-1-sulfonic acid anhydride, 4-hydroxyheptacosane-1-sulfonic acid anhydride, 4-hydroxyoctacosane-1-sulfonic acid anhydride, 4-hydroxynonacosane-1-sulfonic acid anhydride, 4-hydroxytriacontane-1-sulfonic acid anhydride, the corresponding 3-hydroxyalkane-1-sulfonic acid anhydrides of the above, 4-hydroxy-5-methylhexane-1-sulfonic acid anhydride, 4-hydroxy-6-methylheptane-1-sulfonic acid anhydride, 4-hydroxy-5,5-dimethylhexane-1-sulfonic acid anhydride, 4-hydroxy-7-methylnonane-1-sulfonic acid anhydride, 4-hydroxy-7-methyltetradecane-1-sulfonic acid anhydride, 4-hydroxy-8-methyleicosane-1-sulfonic acid anhydride, 4-hydroxy-8-methylheneicosane-1-sulfonic acid anhydride, 4-hydroxy-7-ethyloctadecane-1-sulfonic acid anhydride, 4-hydroxy-10-propyloctadecane-1-sulfonic acid anhydride, 4-hydroxy-7,10-dimethyltetradecane-1-sulfonic acid anhydride, 4-hydroxy-6,12-dimethylheneicosane-1-sulfonic acid anhydride, 4-hydroxy-9-ethyl, 11-methyloctadecane-1-sulfonic acid anhydride, 4-hydroxy-7-methoxydecane - 1 - sulfonic acid anhydride, 4-hydroxy-10-ethoxypentadecane-1-sulfonic acid anhydride, 4-hydroxy-8-nitrohexadecane-1-sulfonic acid anhydride, 4-hydroxy-12-phenyloctadecane-1-sulfonic acid anhydride, 4-hydroxy-7-decene-1-sulfonic acid anhydride, 4-hydroxy-10-tetradecene-1-sulfonic acid anhydride, 3-hydroxy-4-methylhexane-1-sulfonic acid anhydride, 3-hydroxy-5-methylheptane-1-sulfonic acid anhydride, 3-hydroxy - 4,4 - dimethylhexane - 1 - sulfonic acid anhydride, 3-hydroxy-6-methylnonane - 1 - sulfonic acid anhydride, 3-hydroxy-6-methyltetradecane-1-sulfonic acid anhydride, 3-hydroxy-3-methyleicosane-1-sulfonic acid anhydride, 3-hydroxy-7-methylheneicosane-1-sulfonic acid anhydride, 3-hydroxy-6-ethyloctadecane-1-sulfonic acid anhydride, 3-hydroxy-9-propyloctadecane-1-sulfonic acid anhydride, 3-hydroxy-6,9-dimethyltetradecane-1-sulfonic acid anhydride, 3-hydroxy-5,11-dimethyltetradecane-1-sulfonic acid anhydride, 3 - hydroxy-8-ethyl,11-methyloctadecane-1-sulfonic acid anhydride, 3-hydroxy-6-methoxydecane-1-sulfonic acid anhydride, 3-hydroxy-9-ethoxypentadecane-1-sulfonic acid anhydride, 3-hydroxy-7-nitrohexadecane-1-sulfonic acid anhydride, 3-hydroxy-11-phenyloctadecane-1-sulfonic acid anhydride, 3-hydroxy-6-decene-1-sulfonic acid anhydride, 3-hydroxy-9-tetradecene-1-sulfonic acid anhydride.

The second reactant employed herein is an alkali or alkaline earth metal carboxylate. By "alkali metal" I mean to include sodium and potassium, with sodium being preferred. By "alkaline earth metal" I mean to include magnesium, calcium and barium. The carboxylate or anionic portion of said second reactant can be derived from carboxylic acids selected from the group containing of fatty acids, monochlorosubstituted fatty acids and monomethoxysubstituted fatty acids having from two to five carbon atoms, such as acetic acid, propionic acid, butyric acid, isobutyric acid, α-methylbutyric acid, pivialic acid, α-methoxyacetic acid, β - methoxybutyric acid, α - chloroacetic acid, β-chlorobutyric acid, etc. Examples of such alkali or alkaline earth metal carboxylates include lithium acetate, sodium acetate, potassium acetate, cesium acetate, sodium propionate, potassium propionate, sodium butyrate, potassium butyrate, lithium isobutyrate, potassium isobutyrate, sodium α-methylbutyrate, potassium α-methylbutyrate, sodium pivalate, potassium pivalate, lithium α-methoxyacetate, sodium α-methoxyacetate, potassium α-methoxyacetate, sodium β-methoxybutyrate, sodium α-chloroacetate, sodium β-cholorbutyrate, beryllium acetate, magnesium acetate, calcium acetate, strontium acetate, barium acetate, beryllium propionate, calcium propionate, barium propionate, calcium butyrate, barium butyrate, magnesium isobutyrate, barium isobutyrate, calcium, α-methylbutyrate, barium α-methylbutyrate, beryllium pivalate, calcium pivalate, barium pivalate, beryllium α-methoxyacetate, calcium α-methoxyacetate, barium α-methoxyacetate, magnesium β-methoxybutyrate, barium β-methoxybutyrate, calcium α-chloroacetate, barium α - chloroacetate, magnesium β - chlorobutyrate, barium β-chlorobutyrate, etc. Of these I prefer to use sodium acetate.

The reaction defined herein is simply effected by bringing together, in a suitable reaction zone, the above-defined hydroxy sulfonic acid anhydride and the alkali metal or alkaline earth metal carboxylate. Although the reaction will proceed with the hydroxy sulfonic acid anhydride and the defined metal carboxylate present over a wide molar ratio, for example, over a molar ratio of about 1:10 to about 10:1, preferably from about 1:1.5 to about 1.5:1, it is preferred that the two reactants be present in approximately equal molar amounts for reasons of economy and to avoid recovery of unreacted starting material. Pressure is not critical and can be varied over wide limits, for example, from a low of about one millimeter of mercury to as high as about fifty pounds per square inch, although atmospheric pressure is preferred. As will be pointed out below, a by-product produced herein is a carboxylic acid corresponding to the defined metal carboxylate reactant. In order to effectively and economically carry out the reaction defined herein, in a preferred embodiment, the pressure desirably corresponds to the boiling point of said by-product carboxylic acid at reaction temperature. This means that not only is the reaction product simultaneously freed of an unwanted product but such unwanted product can be regenerated to the defined metal carboxylate. Thus, for example, when sodium acetate is employed in the reaction and acetic acid is obtained as a by-product, the acetic acid can be regenerated to sodium acetate. This can be done in any effective manner, for example, the acetic acid may be reacted with aqueous sodium hydroxide at temperatures in excess of 40° C. Crystallization of sodium acetate from this solution will yield the unhydrated salt which may be recovered by filtering. Final drying at about 120° C. will give anhydrous sodium acetate suitable for recycling in this process.

In order to obtain a reaction product predominating, that is, having at least eighty weight percent and preferably at least 93 weight percent, in alkene sulfonates, it is imperative that the reaction temperature and residence time be strictly controlled. The temperature must be at least about 135° C. but no higher than about 200° C., but preferably must be maintained within a range of about 150° to about 180° C. Residence time must be within a range of about ten to about thirty hours, preferably from about fifteen to about twenty hours.

The reaction at this point is believed to have proceeded as follows to form a mixture of alkene sulfonates, using sodium acetate as representative of the defined metal carboxylate reactant:

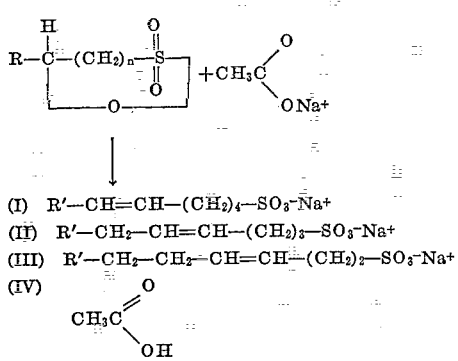

(I) R′—CH=CH—(CH₂)₄—SO₃⁻Na⁺
(II) R′—CH₂—CH=CH—(CH₂)₃—SO₃⁻Na⁺
(III) R′—CH₂—CH₂—CH=CH—(CH₂)₂—SO₃⁻Na⁺
(IV) $CH_3C\diagup^O_{\diagdown OH}$ wherein R and n are as defined above and R′ can be hydrogen or one of the defined alkyl substituents having from one to 24 carbon atoms, preferably from four to fourteen carbon atoms. In a typical run the molar amount of Compound III present in the reaction mixture is about twice the molar amount of Compound II, while the latter is about six times the molar amount of Compound I. In addition to the above, smaller amounts of less soluble metal salts, such as 3- and 4-acetoxyalkane-1-sulfonates, for example, sodium 3-acetoxydodecane-1-sulfonate, potassium 4-acetoxyoctadecane-1-sulfonate, calcium 3-acetoxytetradecane-1-sulfonate, barium 4 - acetoxydecane - 1- sulfonate also may be present.

At then end of the reaction period the reaction mixture can be cooled and employed as such, for example, in household detergents or as higher molecular weight alkali or alkaline earth metal salts useful as oil-soluble detergents. If purification is desired, however, this can be effected in any convenient manner. If excess hydroxy sulfonic acid anhydride is present it can be removed by dissolving the reaction mixture in an aqueous alcohol, such as fifty volume percent aqueous isopropanol, then extracted with hexane to dissolve the hydroxy sulfonic acid anhydride. The aqueous layer is then evaporated to dryness, leaving behind the alkene sulfonates. If inorganic salts and/or residual metal carboxylate are present, the mixture can be slurried with an alcohol, such as methanol, which dissolves the desired alkene sulfonates. Filtration will then remove any inorganic salts and/or metal carboxylate that may be present. Evaporation of the filtrate to dryness will result in the recovery of the desired alkene sulfonates.

The operation of the defined procedure is somewhat unusual. Thus, a study of the procedure defined in U.S. Patent No. 3,255,240 to Wolfram et al., dated June 7, 1966, would have led one skilled in the art to believe that reaction of a hydroxy sulfonic acid anhydride with a relatively weak base, such as sodium acetate, would result in an addition product of the two and not in a product predominating in alkene sulfonates. Since the process defined herein can be carried out without a solvent and without a catalyst the purification procedure ordinarily involved in a chemical reaction is greatly simplified. Simplification is further apparent in the fact that the carboxylic acid by-product obtained can be removed from the reaction zone simultaneously with the production of the desirable alkene sulfonates. Regeneration of the carboxylic acid so recovered to metal carboxylate reactant further renders the process defined herein commercially attractive. Also extremely important is the fact that the reaction herein results in the conversion of substantially all of the hydroxy sulfonic acid anhydride to a mixture predominating substantially in alkene sulfonates.

The reaction defined and claimed herein can be further understood by reference to the following.

EXAMPLE I

Into an open vessel there were placed fifty grams (0.165 mol) of C₁₆ anhydride of a hydroxy sulfonic acid and 13.5 grams (0.165 mol) of anhydrous sodium acetate. Nuclear magnetic resonance determinations of prior samples of the C₁₆ anhydride of a hydroxy sulfonic acid used had previously shown that from 75 to 95 weight percent of such anhydride was

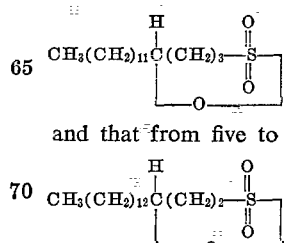

and that from five to 25 weight percent was $CH_3(CH_2)_{12}\overset{H}{\underset{|}{C}}(CH_2)_2-\overset{O}{\underset{\|}{S}}$ The mixture was heated for sixteen hours at a temperature of 140 C. with occasional stirring. The vessel was open to the atmosphere during the reaction and the acetic acid produced was permitted to escape from the reaction zone. The reaction product was cooled to room temperature and dissolved in 500 grams of fifty volume percent aqueous ispropanol, extracted with 300 grams of hexane and then evaporated to dryness. The solids obtained were then dissolved in 1000 grams of methanol to remove inorganic salts and other insoluble materials which might be present. After filtration the filtrate was evaporated to dryness, resulting in 48 grams of product. All of the $C_{16}$ hydroxy sulfonic acid anhydride was converted during the reaction to a product predominating substantially solely in alkene sulfonates. By means of bromine number determination and periodate cleavage, it was found that 4.8 weight percent of the product was $CH_3(CH_2)_9CH=CH-(CH_2)_4-SO_3-Na$, 30.0 weight percent was $CH_3(CH_2)_{10}CH=CH-(CH_2)_3-SO_3-Na$ and 64.1 weight percent was

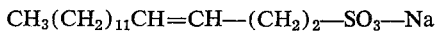

$$CH_3(CH_2)_{11}CH=CH-(CH_2)_2-SO_3-Na$$

EXAMPLE II

That temperature and residence time are critical herein in obtaining a reaction product predominating in alkene sulfonates is shown by the following. The run of Example I was repeated several times using fifty grams (0.165 mol) of the same $C_{16}$ anhydride of a hydroxy sulfonic acid and 13.5 grams (0.165 mol) of anhydrous sodium acetate. The results obtained are tabulated below in Table I.

TABLE I

| Run No. | Time, hours | Temperature, ° C. | Mol percent anhydride conversion | Mol percent alkene sulfonate |
|---|---|---|---|---|
| 1 | 4 | 150 | 95 | 31 |
| 2 | 4 | 175 | 100 | 47 |
| 3 | 18 | 125 | 67 | 28 |
| 4 | 18 | 150 | 100 | 90 |
| 5 | 18 | 175 | 100 | 94 |

Obviously, many modifications and variations of the invention, as hereinabove set forth, can be made without departing from the spirit and scope thereof, and therefore only such limitations should be imposed as are indicated in the appended claims.

I claim:

1. A process for preparing an alkene sulfonate which comprises heating an anhydride of a hydroxy sulfonic acid defined by the structural formula:

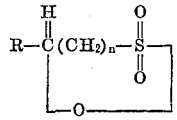

wherein R is an alkyl substituent having from two to 26 carbon atoms and $n$ is an integer from two to three with a compound consisting of anhydrous alkali or alkaline earth metal salt of a monocarboxylic acid having two to five carbon atoms selected from the group consisting of fatty acids; monochlorosubstituted fatty acids and monomethoxysubstituted fatty acids at a temperature of about 135° to about 200° C. for about ten to about 30 hours.

2. The process of claim 1 wherein said metal carboxylate is sodium acetate.

3. The process of claim 1 wherein an organic acid is also obtained corresponding to the carboxylic acid portion of said metal carboxylate.

4. The process of claim 1 wherein an organic acid is also obtained corresponding to the carboxylic acid portion of said metal carboxylate and said carboxylic acid is regenerated to said metal carboxylate.

5. A process according to claim 1 wherein R is an alkyl substituent having from six to 16 carbon atoms and $n$ is three.

6. The process of claim 1 wherein R is an alkyl substituent having from six to 16 carbon atoms and $n$ is two.

7. A process according to claim 5 wherein said alkali metal carboxylate is sodium acetate.

8. A process according to claim 6 wherein said alkali metal carboxylate is sodium acetate.

9. A process according to claim 3 wherein said alkali metal carboxylate is sodium acetate and said organic acid is acetic acid.

10. A process according to claim 3 wherein the reaction pressure corresponds to the boiling point of said organic acid at reaction temperature.

11. A process according to claim 10 wherein the organic acid is continuously removed as formed, is continuously regenerated to form said alkali or alkaline earth metal carboxylate and is continuously recycled to said process under anhydrous conditions for the preparation of said alkene sulfonate.

12. A process according to claim 10 wherein said organic acid is acetic acid.

References Cited

FOREIGN PATENTS 1,218,434  6/1966  Germany.
894,116  10/1953  Germany.
901,054  1/1954  Germany.

DANIEL D. HORWITZ, Primary Examiner

U.S. Cl. X.R.

260—541

PO-1050
(5/69)

UNITED STATES PATENT OFFICE
CERTIFICATE OF CORRECTION

Patent No. 3,502,716   Dated   March 24, 1970

Inventor(s) George F. Kite

It is certified that error appears in the above-identified patent and that said Letters Patent are hereby corrected as shown below:

Column 3, about line 58, "$CH_3C\genfrac{}{}{0pt}{}{O}{ONa^+}$" should read -- $CH_3C\genfrac{}{}{0pt}{}{O}{O^-Na^+}$ --;

and lines 65-70, -- + -- has been omitted between the products represented by I and II, II and III, and III and IV. Column 4, line 11, after "at", "then" should read -- the --.

SIGNED AND
SEALED
SEP 29 1970

(SEAL)
Attest:

Edward M. Fletcher, Jr.
Attesting Officer

WILLIAM E. SCHUYLER, JR.
Commissioner of Patents